United States Patent
Hariharan et al.

(10) Patent No.: US 10,140,352 B2
(45) Date of Patent: Nov. 27, 2018

(54) INTERFACING WITH A RELATIONAL DATABASE FOR MULTI-DIMENSIONAL ANALYSIS VIA A SPREADSHEET APPLICATION

(71) Applicant: Oracle International Corporation, Redwood Shores, CA (US)

(72) Inventors: Sreeram Hariharan, Foster City, CA (US); Swathi Uppala, Bengaluru (IN); Mohammed Hussain Shirkol, Foster City, CA (US); Usha Arora, Sunnyvale, CA (US); Ashish Pathak, San Ramon, CA (US); Kashif Suleman, Salinas, CA (US); Ramchand Raman, Redwood Shores, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 416 days.

(21) Appl. No.: 14/334,556

(22) Filed: Jul. 17, 2014

(65) Prior Publication Data
US 2016/0019281 A1    Jan. 21, 2016

(51) Int. Cl.
*G06F 17/30* (2006.01)
(52) U.S. Cl.
CPC ...... *G06F 17/30595* (2013.01); *G06F 17/301* (2013.01); *G06F 17/30091* (2013.01);
(Continued)
(58) Field of Classification Search
CPC ............. G06F 17/246; G06F 17/30592; G06F 17/30424; G06F 17/3089; G06F 17/30554;
(Continued)

(56) References Cited

U.S. PATENT DOCUMENTS 6,151,608 A    11/2000    Abrams
6,373,950 B1    4/2002    Rowney
(Continued)

FOREIGN PATENT DOCUMENTS

WO    9634354    10/1996

OTHER PUBLICATIONS

FileMaker, "FileMaker Platform: Streamline Your Business", FileMaker Platform Overview, Retrieved on Feb. 20, 2014 from https://www.filemaker.com/products/overview.html#industry, 3 pages.
Lakshmanan, et al., "On Querying Spreadsheets", IEEE Xplore Abstract, Retrieved on Feb. 13, 2014 from http://ieeexplore.ieee.org/xpl/articleDetails.jsp?tp=&arnumber=655769, Abstract only, 2 pages.
Bei, et al, "A direct Method of Data Exchange between XML and relational database", IEEE XPlore Abstract, Retreived on Feb. 13, 2014 from http://ieeexplore.ieee.org/xpl/login.jsp?tp=&arnumber=1372389, Abstract only, 2 pages.
(Continued)

*Primary Examiner* — Michelle N Owyang
(74) *Attorney, Agent, or Firm* — Kilpatrick Townsend & Stockton LLP

(57) ABSTRACT

Systems, methods, and computer-readable mediums are presented that may provide for an interface to a relational database. A request may be received for data stored in a relationship database, wherein the request is received from a spreadsheet application. In response to the request for data stored in the relational database, a plurality of tables in the relational database may be accessed to retrieve the data indicated in the request. The retrieved data may be translated from the plurality of tables of the relational database into a format for output to the spreadsheet application. The translated data may be output to the spreadsheet application.

20 Claims, 12 Drawing Sheets

(52) U.S. Cl.
CPC .. *G06F 17/30389* (2013.01); *G06F 17/30427* (2013.01); *G06F 17/30592* (2013.01); *G06F 17/30997* (2013.01)

(58) Field of Classification Search
CPC ............... G06F 17/30557; G06F 17/30; G06F 17/30595; G06F 17/30997
USPC .................................. 715/212; 707/705–780
See application file for complete search history.

(56) References Cited

U.S. PATENT DOCUMENTS

| | | |
|---|---|---|
| 6,581,039 B2 | 6/2003 | Marpe et al. |
| 6,615,220 B1 | 9/2003 | Austin et al. |
| 7,058,807 B2 | 6/2006 | Grawrock et al. |
| 7,159,209 B1 | 1/2007 | Srinivasan et al. |
| 7,299,216 B1 | 11/2007 | Liang et al. |
| 7,774,300 B2 | 8/2010 | Hsiao et al. |
| 7,890,430 B2 | 2/2011 | Lopatic |
| 8,290,951 B1 | 10/2012 | Joa et al. |
| 8,291,501 B2 | 10/2012 | Lynch |
| 8,473,450 B2 | 6/2013 | Bakalash et al. |
| 8,639,675 B2 | 1/2014 | Cotichini et al. |
| 8,725,701 B2 | 5/2014 | Parkes et al. |
| 8,869,020 B2* | 10/2014 | Daga ................. G06F 17/30554 715/212 |
| 9,182,963 B2 | 11/2015 | Mallya |
| 2002/0107809 A1 | 8/2002 | Biddle et al. |
| 2004/0064487 A1 | 4/2004 | Nguyen et al. |
| 2004/0103365 A1 | 5/2004 | Cox |
| 2004/0139111 A1 | 7/2004 | Schoettger et al. |
| 2005/0251812 A1 | 11/2005 | Hayward |
| 2005/0267853 A1* | 12/2005 | Netz ...................... G06F 17/246 |
| 2006/0004595 A1 | 1/2006 | Rowland et al. |
| 2006/0112123 A1 | 5/2006 | Clark et al. |
| 2006/0222163 A1 | 10/2006 | Bank et al. |
| 2006/0287961 A1 | 12/2006 | Mori et al. |
| 2007/0061698 A1* | 3/2007 | Megiddo ............. G06F 17/2247 715/210 |
| 2007/0168868 A1* | 7/2007 | Korzenko ............. G06F 17/218 715/732 |
| 2007/0198562 A1 | 8/2007 | Kulkarni et al. |
| 2007/0219956 A1* | 9/2007 | Milton .................. G06F 17/246 |
| 2007/0220415 A1* | 9/2007 | Cheng .................... G06F 17/246 715/212 |
| 2008/0016041 A1 | 1/2008 | Frost et al. |
| 2008/0205655 A1 | 8/2008 | Wilkins et al. |
| 2008/0235805 A1 | 9/2008 | Pfitzmann et al. |
| 2008/0306983 A1* | 12/2008 | Singh .................... G06F 17/246 |
| 2009/0158251 A1* | 6/2009 | Angrish ............. G06F 17/30569 717/115 |
| 2009/0249488 A1 | 10/2009 | Robinson et al. |
| 2012/0023101 A1* | 1/2012 | Heimendinger .. G06F 17/30522 707/737 |
| 2012/0173476 A1* | 7/2012 | Rizvi ................ G06F 17/30539 707/601 |
| 2012/0311426 A1* | 12/2012 | Desai .................. G06F 17/2705 715/227 |
| 2013/0024760 A1* | 1/2013 | Vogel .................... G06F 9/4443 715/212 |
| 2013/0086064 A1* | 4/2013 | Salch .................... G06F 17/246 707/736 |
| 2013/0124957 A1* | 5/2013 | Oppenheimer ... G06F 17/30964 715/212 |
| 2013/0305149 A1 | 11/2013 | Dimitrov et al. |
| 2016/0292206 A1 | 10/2016 | Ruiz Velazquez et al. |

OTHER PUBLICATIONS

Oracle, "Oracle Hyperion Smart View for Office: User's Guide", Oracle Enterprise Performance Management System, Release 11.1.2.2 , Copyright 2012, Retrieved from http://docs.oracle.com/cd/E17236_01/epm.1112/sv_user.pdf 336 pages.

Amphis Software, "Import Customers from a Spreadsheet Into CRM Software", Copyright 2013, Retrieved Feb. 13, 2014, from http://www.amphis-software.com/spreadsheet.htm, 4 pages.

AutomationAnywhere.com, "SAP & Excel: Simple, Secure, More Usable", Retrieved on Feb. 13, 2014, from http://www.automationanywhere.com/landing/sap-to-excel.htm, 1 page.

AutomationAnywhere.com, "SAP Automation: Make Your SAP Processes Easier to Use", Copyright 2013, Retrieved on Feb. 20, 2014, from http://www.automationanywhere.com/solutions/sapautomation.htm, 1 page.

CaTissue, Data Migration, caBIG, http://gforge.nci.nih.gov/docman/view.php/18/7786/caTissueDataMigration_TBPT_F2F_2007.ppt, 2007, 7 pages.

DatabaseBridge, Skyway Technology, Retrieved from the internet: http://www.skywaytechnology.com/products.htm, 2 pages, archived on Oct. 11, 2006.

DataMAPPER, Applied Database Technology, Retrieved from the internet: http://www.adbtech.com/data1.html, Copyright 2004, 2 pages.

DataSlave 1.2, Baycastle Software Ltd, Retrieved from the internet: http://www.modemtools.com/programs/Baycastle-Software-Ltd/DataSlave.htm, Copyright 2005-2007, 1 page.

Enterprise-wide data quality with Informatica Data Explorer and Informatica Data Quality, Informatica, retrieved from the internet http://www.sun.com/thirdparty/srsc/resources/informatica/InfaDQDEbrochure.pdf, Aug. 25, 2008, 3 pages.

Migrate, Arbutus Software, Retrieved from the internet: http://www.arbutussoftware.com/products-migrate.htm, 2 pages, archived on Aug. 30, 2009.

SwiftForm as Data Migration Tool, Miscot System, Retrieved online from: http://www.miscot.com/swiftform.htm, Copyright 2004, 3 pages.

Carreira et al., Efficient development of data migration transformations, Retrieved from the internet: http://delivery.acm.org/10.1145/1010000/1007692/p915-carreira.pdf?key1=1007692&key2=9481407021&coll=Portal&dl=GUIDE&CFID=22383522&CFTOKEN=4360073, 2004, 2 pages.

Nassif et al., Issues and approaches for migration/cohabitation between legacy and new systems, US West Advanced Technologies, retrieved from the internet: http://delivery.acm.org/10.1145/1010000/1007692/p915-carreira.pdf?key1=1007692&key2=9481407021&coll=Portal&dl=GUIDE&CFID=22383522&CFTOKEN=4360073, 1993, pp. 471-474.

Zhao et al., Exploring Attribute Correspondences across Heterogeneous Databases by Mutual Information, Journal of Management Information Systems vol. 22, No. 4, Crossing Boundaries in Information Systems Research. Online Available at: http://delivery.acm.org/10.1145/1280000/1278034/71eerk1m02gfjrx6.pdf?key1=1278034&key2=7201407021&coll=Portal&dl=GUIDE&CFI, 2006, pp. 305-336.

U.S. Appl. No. 14/675,068, Non-Final Office Action dated May 17, 2017, 16 pages.

\* cited by examiner

| | A | B | C | D | E | F | G | H | I | J | K | L |
|---|---|---|---|---|---|---|---|---|---|---|---|---|
| 1 | | | | | | | | | | | | |
| 2 | | | | | | | | | View Detail | | | |
| 3 | | | | | | | | | | | | |
| 4 | Simulation | SR-SIM-1 | Description | SR sanity | test simulation 1 | | | | | | | |
| 5 | Simulation | 18-JUN-2013 12:37:23 | Status | Finished | | | | | | | | |
| 6 | Basis Cost | Frozen | Effectivity | 19-JUN-2013 | | | | | | | | |
| 7 | Assignment | Set | Buy Cost | Type | | | | | | | | |
| 8 | Basis Alt | BOM | Basis Alt | Routing | | | | | | | | |
| 9 | Engineering | No | Unimplem | No | | | | | | | | |
| 10 | Lot Size O | Use Existing Lot Size | Lot Size | | | | | | | | | |
| 11 | Conversio | Corporate | | | | | | | | | | |
| 12 | Assembly | PT55066 | | | | | | | | | | |
| 13 | Organizat | M1 | | | | | | | | | | |
| 14 | Total Exte | 859.33 | | | | | | | | | | |
| 15 | | | | | | | | | | | | |
| 16 | | | | | | | | | | | | |
| 17 | Row Num | Item | Level | Op | Organizatio | Source Org | Departmen | Cost Elem | Sub Eleme | Qty Per Assembly | Resource | Rate or Ar |
| 18 | 1 | PT55066 | 1 | | M1 | | | | | | | |
| 19 | 2 | AS72111 | 2 | 1 | M1 | | | | | 2.00 | | |
| 20 | 3 | CM5437 | 2 | 1 | M1 | | | | | 1.00 | | |
| 21 | 4 | CM51565 | 2 | 1 | M1 | | | | | 1.00 | | |

FIG. 5

| | A | B | C | D | E | F | G | H | I | J | K | L |
|---|---|---|---|---|---|---|---|---|---|---|---|---|
| 1 | | | | | | | | | | | | |
| 2 | | | | | | | | | View Detail | | | |
| 3 | | | | | | | | | | | | |
| 4 | Simulation | SR-SIM-1 | Description | SR sanity | test simulation 1 | | | | | | | |
| 5 | Simulation | 18-JUN-2013 12:37:23 | Status | Finished | | | | | | | | |
| 6 | Basis Cost | Frozen | Effectivity | 19-JUN-2013 | | | | | | | | |
| 7 | Assignment | Set | Buy Cost | Type | | | | | | | | |
| 8 | Basis Alt | BOM | Basis Alt | Routing | | | | | | | | |
| 9 | Engineering | No | Unimplem | No | | | | | | | | |
| 10 | Lot Size O | Use Existing Lot Size | Lot Size | | | | | | | | | |
| 11 | Conversio | Corporate | | | | | | | | | | |
| 12 | Assembly | PT55066 | | | | | | | | | | |
| 13 | Organizat | M1 | | | | | | | | | | |
| 14 | Total Exte | 859.33 | | | | | | | | | | |
| 15 | | | | | | | | | | | | |
| 16 | 611 | | | | | | | | | | | |
| 17 | Row Num | Item | Level | Op | Organizatio | Source Org | Departmen | Cost Elem | Sub Eleme | Qty Per Assembly | Resource | Rate or Ar |
| 18 | 1 | PT55066 | 1 | | M1 | | | | | | | |
| 19 | 2 | AS72111 | 2 | 1 | M1 | M1 | | | | | | |
| 20 | 22 | AS72111 | 2 | 40 | M1 | M1 | TESTING | Resource | TESTER | 1.00 | 12.00 | 0.75 |
| 21 | 32 | AS72111 | 2 | 60 | M1 | M1 | PACKING | Overhead | Facility | | | 0.10 |
| 22 | 33 | AS72111 | 2 | 60 | M1 | M1 | PACKING | Resource | LBR-PACK | | | 5.00 |
| 23 | 34 | AS72111 | 2 | 60 | M1 | M1 | PACKING | Overhead | Benefits | | 0.30 | 0.25 |
| 24 | 35 | CM96717 | 3 | 30 | M1 | M1 | | | | 12.00 | | |
| 25 | 36 | CM67433 | 3 | 30 | M1 | M1 | | | | 1.00 | | |
| 26 | 37 | CM76962 | 3 | 30 | M1 | M1 | | | | 1.00 | | |
| 27 | 38 | CM74237 | 3 | 30 | M1 | M1 | | | | 1.00 | | |
| 28 | 39 | CM86324 | 3 | 60 | M1 | M1 | | | | 1.00 | | |
| 29 | 40 | CM28287 | 3 | 60 | M1 | M1 | | | | 1.00 | | |

FIG. 6

INTERFACING WITH A RELATIONAL DATABASE FOR MULTI-DIMENSIONAL ANALYSIS VIA A SPREADSHEET APPLICATION

BACKGROUND

Accessing data stored in one or more databases may be useful to a user, whether for viewing such data, for simulating changes to such data, and/or for modifying such data. However, accessing data stored in a database may be difficult for a user, especially if forced to work with an interface with which the user is not familiar. Further, various forms of database may tend to require different user skills in order to access and understand the data structures in which the data is stored in the database.

SUMMARY

Various systems, methods, and computer-readable mediums are presented herein for providing an interface to a relational database. Such embodiments may include a relational interface web server, a user computer system, and/or a relational database server. In some embodiments, a request may be received for data stored in a relationship database, wherein the request is received from a spreadsheet application. In response to the request for data stored in the relational database, a plurality of tables in the relational database may be accessed to retrieve the data indicated in the request. The retrieved data may be translated from the plurality of tables of the relational database into a format for output to the spreadsheet application. The translated data may be output to the spreadsheet application.

Embodiments of such systems, methods, and computer-readable mediums may include one or more of the following features: The spreadsheet application may be executed, wherein the spreadsheet application uses a software extension to enable communication with the relational interface web server. Via a first plurality of cells of the spreadsheet application, data retrieved from the plurality of tables of the relational database may be presented, wherein the user computer system accesses the relational interface web server via a first network connection. Data may be stored using the plurality of tables, wherein the relational database server is accessible by the relational interface web server. A request may be received for a layout of the data wherein the request is received from the spreadsheet application. In response to the request for the layout of the data, metadata may be fetched from the relational database that defines one or more properties of the data. The metadata may be output to the spreadsheet application. A request may be received for authorization and authentication of a user from the spreadsheet application. In response to the request, an authorization and authentication of the user may be performed. An authorization and authentication may be provided response to the spreadsheet application. The user computer system may present, via a second plurality of cells of the spreadsheet application, data retrieved from a multidimensional database management system distinct from the relational database. The first plurality of cells and the second plurality of cells may be presented concurrently. An indication of a selection of a cell may be received from within the spreadsheet application. It may be determined that the cell corresponds to hierarchical data. Data corresponding to the hierarchical data may be retrieved. Data corresponding to the hierarchical data may be output to the spreadsheet application.

BRIEF DESCRIPTION OF THE DRAWINGS

A further understanding of the nature and advantages of various embodiments may be realized by reference to the following figures. In the appended figures, similar components or features may have the same reference label.

FIG. 5 illustrates an embodiment of a spreadsheet application being used as an interface for a relational database in which hierarchical data is available.

FIG. 6 illustrates an embodiment of a spreadsheet application being used as an interface for a relational database in which hierarchical data is presented.

DETAILED DESCRIPTION

Figure 1:
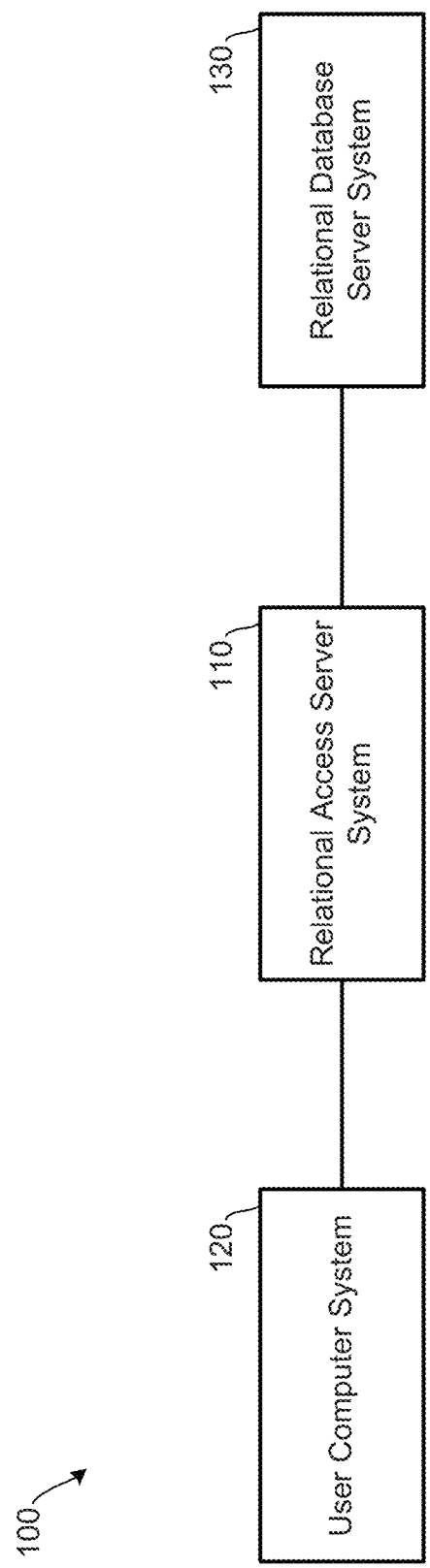
FIG. 1 illustrates an embodiment of a system for providing an interface to a relational database.

A spreadsheet application may be used as a user interface to allow a user to view, access, edit, and otherwise interact with data stored in one or more relational databases. A multidimensional database, since its data may be arranged similarly to a cube, may lend itself to be more readily translatable into a format that can be presented to a user via a spreadsheet. However, a relational database is organized differently: A relational database is typically stored in the form of multiple tables with related tables having data linked by foreign keys. Therefore, a separate arrangement may be used to access, reorganize, and output data from the relational database for presentation to a user in the form of a spreadsheet. Such an arrangement can leverage a spreadsheet application that the user is already familiar with, such as Microsoft® Excel®, to serve as the spreadsheet interface being executed by the user's computer system.

The spreadsheet application executed by the user's computer may have an add-on, such as an installed extension, that allows the spreadsheet application to interact with a relational access server. Such a relational access server may function to serve as an intermediary between the user's spreadsheet application and the relational database. The user may be permitted to request various data stored by the relational database in multiple tables. The Relational access server may serve to determine the user's authorization to access the relational database and to authenticate the user. The relational access server may further serve to access a shared pool of database connections and retrieve metadata (e.g., data type) from the relational database for the type of data that the user is attempting to access. This metadata may be passed to the spreadsheet program to properly format and/or otherwise prepare the spreadsheet for presenting data from the relational database. The user may be permitted, via the spreadsheet application, to submit a query to retrieve data (and/or a request to modify data) in the relational database. The relational access server may obtain a shared database connection from a pool and access multiple tables present in the relational database to retrieve (and/or modify) the data requested by the user. The data requested by the user may be formatted by the relational access server and passed to the spreadsheet application executing on the user computer system for presentation to the user as part of the spreadsheet.

While data is presented to the user via various cells of the spreadsheet application, the spreadsheet application retains its functionality in being able to perform calculations and other forms of data manipulation on the values presented in the various cells of the spreadsheet. As such, the user can interact with data from the relational database in conjunction with other data created, stored, or accessed at the user computer system. In some embodiments, the spreadsheet application may be used to interface with multiple databases simultaneously, including one or more multidimensional databases and one or more relational databases. For example, a single spreadsheet may be presenting data retrieved from both types of databases (e.g., in different cells of a single worksheet or on different worksheets). Thus, the spreadsheet application serves as the user's interface to view, interact, modify, and perform simulations on data stored by one or more relational databases (and, possibly, one or more multidimensional databases). Further, details regarding various aspects are provided in relation to the figures.

FIG. 1 illustrates an embodiment of a system 100 for providing an interface to a relational database. System 100 may include relational access server system 110, user computer system 120, and relational database server system 130. In some embodiments, each of these components are distinct computer systems. In other embodiments, a single piece of hardware, or group of hardware (e.g., server group) can function as multiple components of system 100. For instance, Relational access server system 110 may be performed by a common piece or set of computerized hardware as relational database server system 130.

User computer system 120 may be a personal computer, laptop, tablet computer, smart phone, or various other forms of a computing device that may be used by an end user. For example, referring to FIG. 10, a smartphone (as client computing device 1004), HMD (as client computing device 1002), a tablet computer (as client computing device 1006), or device 1008 may function as various forms of user computer systems. Whatever the form of user computer system 120, user computer system 120 may be capable of either executing or at least accessing (e.g., via a web browser) a spreadsheet application. User computer system 120 may be in communication with relational access server system 110. User computer system 120 may directly access relational access server system 110, such as via a direct connection. Or, in some embodiments, the functions of Relational access server system 110 may be executed by a same piece or group of hardware as user computer system 120. In many embodiments, Relational access server system 110 is accessible via one or more networks, such as the Internet and/or a corporate local area network (LAN) by user computer system 120.

While system 100 of FIG. 1 illustrates a single user computer system 120 in communication with relational access server system 110, it should be understood that this is merely an example. Many more user computer systems may be access relational access server system 110 in order to access data stored by relational database server system 130. For instance, hundreds of user computer systems may be accessing the relational access server during a given time period.

Relational access server system 110 may serve as an intermediary between user computer system 120 and relational database server system 130. Relational access server system 110 may: receive various forms of requests from user computer system 120, process such requests, access one or more relational databases on relational database server system 130, and provide responses to user computer system 120. As such, requests for data in relational database server system 130 may be routed to Relational access server system 110 by user computer system 120. Relational access server system 110 may manage user authorization and authentication for accessing data stored in relational tables of relational database server system 130. Relational access server system 110 may also serve to retrieve metadata for data stored by relational database server system 130. This metadata may be used to format cells of the spreadsheet application presented on user computer system 120 properly. Further, Relational access server system 110 may serve to retrieve and modify data stored by relational database server system 130. Such data may be presented via the spreadsheet application on user computer system 120. User computer system 120 may be in communication with relational access server system 110. Relational access server system 110 may directly access relational database server system 130, such as via a direct connection. Or, in some embodiments, the functions of Relational access server system 110 may be executed by a same piece or group of hardware as relational database server system 130. In many embodiments, Relational access server system 110 communicates via one or more networks, such as the Internet and/or a corporate local area network (LAN) with relational database server system 130.

FIG. 1 illustrates Relational access server system 110 in communication with a single relational database server system 130. This is for exemplary purposes only. Relational access server system 110 may communicate with multiple relational database server systems, such as relational database servers that host different relational databases.

Relational database server system 130 may host one or more relational databases, which each may include multiple tables that store various data. Beyond relational access server system 110, various services and other systems may be in communication with relational database server system 130 to perform queries on stored data, add data, delete data, and/or modify data.

Figure 2:
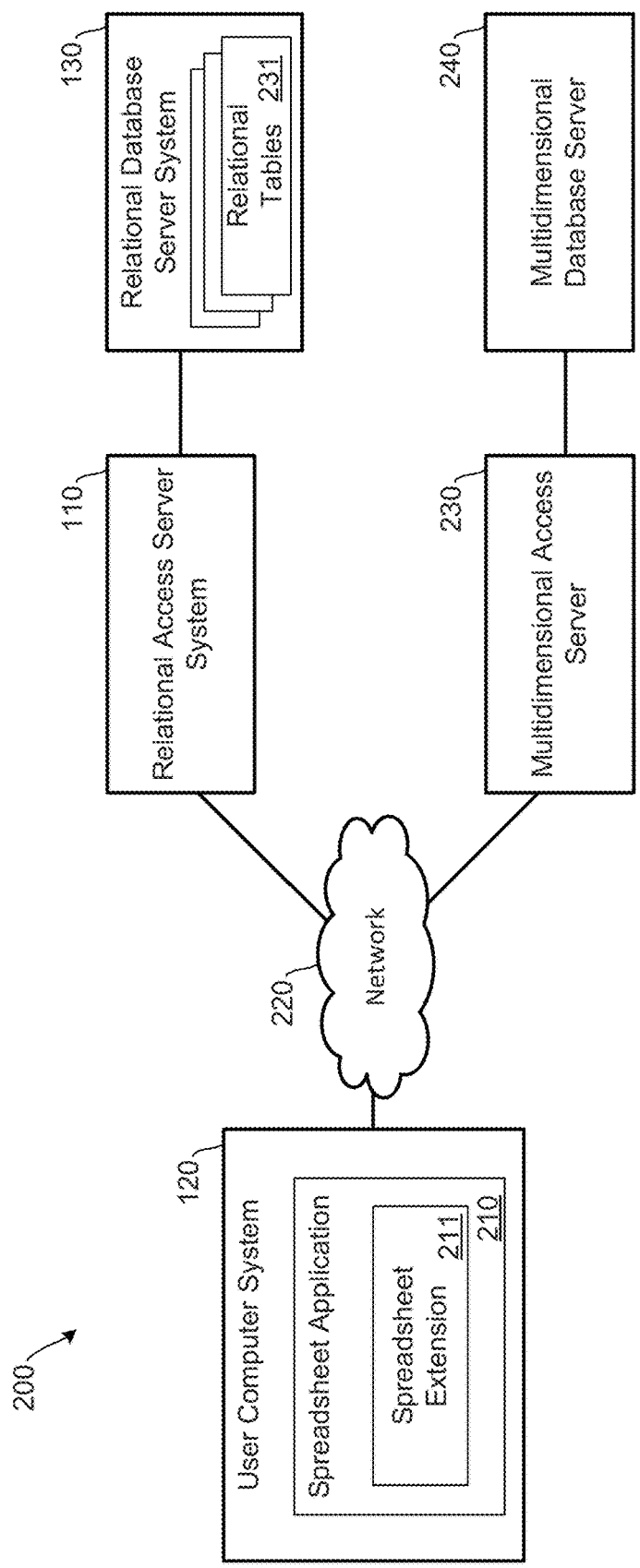
FIG. 2 illustrates another embodiment of a system for providing an interface to a relational database and a multi-dimensional database.

FIG. 2 illustrates another embodiment of a system 200 for providing an interface to a relational database and a multidimensional database. System 200 may represent a more detailed embodiment of system 100 of FIG. 1. System 200 may include: relational access server system 110, user computer system 120, relational database server system 130, network 220, multidimensional access server 230, and multidimensional database server 240. Relational access server system 110 may represent the same relational access server from system 100 of FIG. 1.

Also, user computer system 120 may represent the same user computer system as in system 100 of FIG. 1. In some embodiments, the spreadsheet application may be executed locally by user computer system 120. In system 200, user computer system 120 is executing spreadsheet application 210. In various embodiments, spreadsheet application 210 is Microsoft Excel. In other embodiments, spreadsheet application 210 may be some other spreadsheet application. In system 200, user computer system 120 executes spreadsheet application 210 locally. In other embodiments of system 200, spreadsheet application 210 may be executed remotely. For instance, spreadsheet application 210 may be presented via a web-based interface, such as a web browser, to user via user computer system 120 while execution of spreadsheet application 210 is managed by a remote server. For instance, in such embodiments, spreadsheet application 210 may be understood as a web or cloud service. The remainder of this document will focus on embodiments in which spreadsheet application 210 is executed locally by user computer system 120; however, such embodiments may be equally applicable to situations in which spreadsheet application 210 is executed remotely from user computer system 120 and user computer system 120 is used to present content from the spreadsheet application to a user and receive user input.

Spreadsheet application 210 may include one or more add-ons, such as in the form of a plug-in or one or more extensions in order to allow spreadsheet application 210 to interact with one or more servers that interface with various forms of databases. In the illustrated embodiment of system 200, spreadsheet application 210 has spreadsheet extension 211 installed. Spreadsheet extension 211 may provide spreadsheet application 210 with functionality to communicate with at least relational access server system 110. In some embodiments, spreadsheet extension 211 may also provide spreadsheet application 210 with functionality to communicate with other forms of database servers, such as multidimensional access server 230. Spreadsheet extension 211 may allow spreadsheet application 210 to be used as the user interface to present data to user from one or more relational databases and/or one or more multidimensional databases. By spreadsheet application 210 using the functionality of spreadsheet extension 211, a user can be authorized and authenticated for accessing one or more databases. Further, spreadsheet extension 211 may permit spreadsheet application 210 to have one or more cells properly formatted to present data retrieved from one or more databases, such as a relational database. Further, spreadsheet extension 211 may permit spreadsheet application 210 to receive, present, and/or modify data from one or more databases including one or more relational databases.

User computer system 120 may communicate with Relational access server system 110 via network 220. Network 220 may represent one or more networks functioning in concert to communicatively connect user computer system 120 with relational access server system 110. Network 220 may include the Internet. Network 220 may also include one or more corporate intranets. Similarly, network 220 may serve to connect user computer system 120 with one or more other servers that permit access to a database, such as a different type of database. As illustrated in FIG. 2, network 220 permits user computer system 120 to interface with multidimensional access server 230. While the illustrated embodiment of system 200 illustrates user computer system 120 as being in communication with both Relational access server system 110 and multidimensional access server 230, this is merely an example, user computer system 120 may only be in communication with Relational access server system 110 or multidimensional access server 230. Or, in other embodiments, user computer system 120 may be in communication with other instances of relational access servers and/or multidimensional access servers and/or other types of servers that permit access to various forms of databases.

Multidimensional access server 230 may permit spreadsheet application 210 to be executed by user computer system 120 to interact with one or more multidimensional databases, such as one or more multidimensional databases stored by multidimensional database server 240. For example, one form of multidimensional database with which multidimensional access server 230 may interact may be Oracle's® Essbase (Extended Spread Sheet database). Multidimensional access server 230 may serve to receive, format, and otherwise handle requests from user computer system 120 that relate to data stored by multidimensional database server 240 in one or more multidimensional databases.

Of note, a multidimensional database, such as that hosted by multidimensional database server 240 is structurally different than a relational database, such as that hosted by relational database server system 130. A relational database may include multiple tables, such as indicated by multiple relational tables 231 being stored by relational database server system 130. Each of these tables may store information about a particular entity. Therefore, within a relational database, each table can be understood as representing one entity. In each table, an attribute (or field) may be required to be present (possibly represented as a column) that serves as a "primary key." The primary key is unique for each row within the table and, thus, can be used to locate a particular record or row within the table. Present within a table may be a "foreign key." A foreign key may be used to cross-reference another table of the relational database to obtain other, related information. Therefore, if multiple dimensions of information are to be retrieved from a relational database, it is likely necessary to access multiple tables within the relational database. For example, in a relational database, employee information such as employee number, name, and salary may be stored in an employee table and department information such as department number and department name, may be stored in a separate, department table. The employee numbers and the department numbers may serve as the primary keys for the employee and department tables, respectively. The employee table can store a department number of each employee, which can act as a foreign key to access related information in the department table. In contrast, in a multi-dimensional database, the employee form and department form may be dimensions of the multi-dimensional database. For each intersection of the dimension in multi-dimensional databases, data such as salary is stored. Multi-dimensional databases can also store the sum of salary for each dimensions such as by department and employee, a hierarchy in a department, or a hierarchy in the employee category. Similarly, the data stored can have other dimensions such as region, job roles, etc. and form a multi-dimensional hypercube, which stores data in the format required for multi-dimensional analysis like slicing, dicing, pivoting, etc.

In some embodiments, a relational database and the multidimensional database may be hosted using the same server or group of servers. As such, while maintained separately, a relational database and a multidimensional database may be hosted by the same hardware. Therefore, it may be possible that the relational database hosted by relational database server system 130 and the multidimensional database hosted by multidimensional database server 240 may be hosted by the same hardware in various other embodiments. Similarly, this may be true for Relational access server system 110 and multidimensional access server 230.

Figure 3:
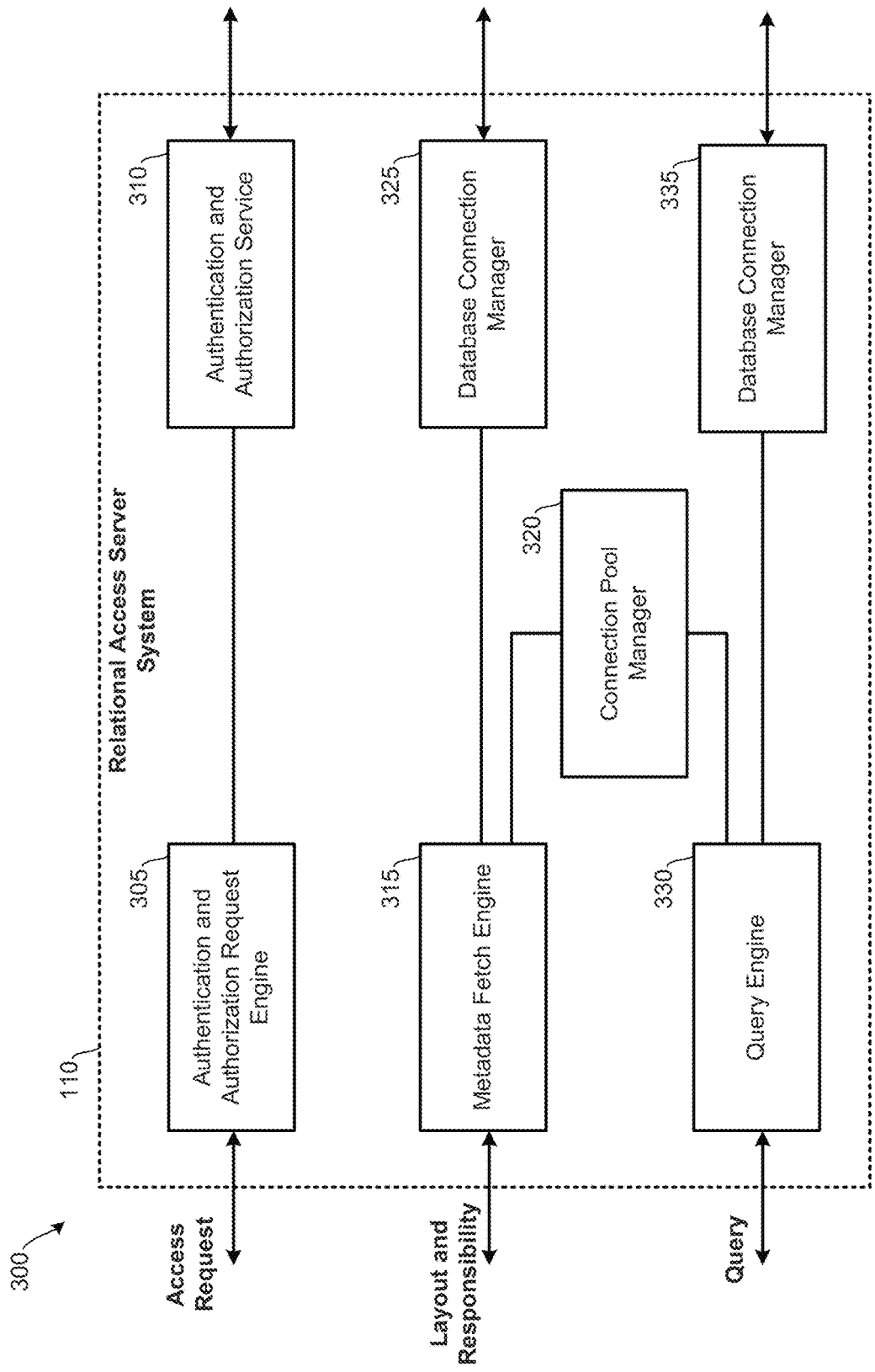
FIG. 3 illustrates an embodiment of a relational access server.

FIG. 3 illustrates an embodiment 300 of a relational access server. Relational access server system 110, as presented in embodiment 300, may represent Relational access server system 110 as presented in FIGS. 1 and/or 2. Embodiment 300 provides various additional details of how Relational access server system 110 may function as an intermediary between a user computer system and a relational database server. Relational access server system 110 may include: authentication and authorization request engine 305, authentication and authorization service 310, metadata fetch engine 315, the connection pool manager 320, database connection manager 325, query engine 330, and database connection manager 335. The various components of Relational access server system 110 may be implemented as hardware, firmware, and/or software executed by underlying hardware. Such components may be broken out into additional distinct components or combined into fewer components. It should be understood that input/output to the left of Relational access server system 110 may be with a user computer system executing a spreadsheet application while input/output to the right of Relational access server system 110 may be with a relational database server system.

Authentication and authorization request engine 305 may serve to handle requests for authorization and authentication received from a user computer system, via a spreadsheet application. Prior to viewing, editing, or otherwise accessing data stored in a relational database, it may be necessary to determine a user's authorization and, possibly, authenticate the user. For example, this authorization and authentication may involve a username and password being supplied. In some embodiments, via an interface presented in the spreadsheet application, a user may provide an access request that includes a username and password. In some embodiments, the spreadsheet program (e.g., via an installed extension) may store the username and password to save the user from having to enter such information each time access to the relational database is desired. Communication between the spreadsheet application having the installed spreadsheet extension may occur via an XML protocol configured for the communication between Relational access server system 110 and user computer systems. Such an XML protocol may be used for the access request for authorization and authentication Further an XML protocol may be used for metadata fetching and data queries.

Following receipt of the access request by authentication and authorization request engine 305, authentication and authorization request engine 305 may format the access request and send data to authentication and authorization service 310. Authentication and authorization service 310 may also be hosted by relational access server or may be hosted remotely, such as by another computer system in communication with the relational database. Authentication and authorization service 310 may be a Java Authentication and Authorization Service (JAAS). By using such a pluggable JAAS, authorization and authentication may be managed separately from the relational database. Authentication and Authorization service 310 may access the relational database or some other data storage structure to determine: if the user is authorized to access the relational database, whether the user is authenticated, and what permissions the user has for the relational database (e.g., read-only access, read/write access). Authentication and authorization service 310 may return a response to authentication and authorization request engine 305, which may, in turn, format and send a response to the user computer system executing the spreadsheet application. If the user is not authenticated or has insufficient permissions to access the relational database, an error message may be returned to the spreadsheet application.

Following successful authorization and authentication, a user may indicate a responsibility and a layout. The layout may refer to the format in which a user would like to see the retrieved data in the spreadsheet application. The layout may function as the data binding layer that connects each cell in the spreadsheet application to a row and/or attribute in the data retrieved from relational tables. The format can be of type header, in which only one row is displayed as header information in the spreadsheet or of type table, in which more than one row is displayed in the spreadsheet. The format may also map database attributes or one or more columns to each cell or column in the spreadsheet. The responsibility specified by the user may alter the access the user has to data in the relational database. The responsibility specified by the user may correspond to the user's job role. For instance, if the responsibility specified is "manager" the data presented may vary from if the user specified "foreman." In this example "manager" might have access to data from all organizations and "foreman" from few.

Metadata fetch engine 315 may receive the user's indication of responsibility and layout via an XML-based message and may access database connection manager 325 to retrieve the corresponding metadata from the relational database. First, in order to access the relational database, a connection to the relational database may be obtained. Due to factors such as overhead, it may be more efficient for a smaller number of connections to the database to be shared among multiple processes being handled by web logic server. As such, connection pool manager 320 may be accessed to obtain an available connection to the relational database. This connection may be used then released back to connection pool manager 320 when the metadata fetch is complete. Once a connection has been obtained from connection pool manager 320, metadata fetch engine 315 may access the relational database via database connection manager 325. Database connection manager 325 may be a Java Database Connectivity (JDBC) module, which is configured to serve as an application programming interface (API) between metadata fetch engine 315 and the relational database. The metadata fetched by metadata fetch engine 315 via database connection manager 325 may be obtained from multiple different tables of the relational database. This metadata may indicate the type of data field in which the data will be presented via the spreadsheet (e.g., string, integer, hierarchal data, etc.). The metadata fetched by metadata fetch engine 315 may be formatted and transmitted to the spreadsheet application being executed by the user computer systems.

After cells of the spreadsheet application have been formatted in accordance with the metadata, a query for specific database may be created by the user and submitted to query engine 330. The user may request, for example, all parts for a particular item, parts having a model number beginning with a certain string of characters, or some other form of search/request that can be formulated by the user via the spreadsheet application. The XML query may be received by query engine 330 and formatted into a form (e.g., a SQL query) that can be used to interrogate the relational database. The user may be permitted to query attributes for which metadata was previously retrieved. For instance, a column related to "part number" may be required to be included in the layout if the user intends to use the part number in formulating the query.

Similarly, as was performed by metadata fetch engine 315, an available database connection may be obtained from connection pool manager 320. Once a connection has been obtained from connection pool manager 320, query engine 330 may access the relational database via database connection manager 335 (which may be the same or a separate instance of the same database connection manager 325) and submit a SQL (or other form of) query. Database connection manager 335 may be a Java Database Connectivity (JDBC) module, which is configured to serve as an application programming interface (API) between query engine 330 and the relational database. The data fetched by query engine 330 via database connection manager 335 may be obtained from multiple different tables of the relational database.

Data retrieved from multiple tables of the relational database by query engine 330 may be formatted into XML statements for transmission to the spreadsheet application being executed by the user computer system. For example, data from a JDBC SQL query could be in a two dimensional array format. It may be converted to a separated string of values (e.g., separated by a character, such as "1"), where each value corresponds to a cell value in the spreadsheet. For example, if the JDBC SQL query fetched employee information like employee number and name as:

1032 James Smith
1045 Patrick Evans.

The metadata layout may indicate to show this data in a second row in the spreadsheet application, the two dimensional data may be converted to a "|" separated string of values as below:

||1032| James Smith|1045| Patrick Evans

In this string, the first two "|" symbols represents empty cells in first row. Similarly "|" strings values may be created for each cell to represent the data type (e.g., number, string, integer, etc.) and/or the status (such as read-only, write/read, etc.). The "|" separated string of cell values, data type, and status are packed as XML and sent to the user computer system for presentation via the spreadsheet application.

Such data may be transmitted to the user computer system for presentation and manipulation via the spreadsheet application. The user may be permitted to view and modify the data presented from the relational database. Accordingly, data from multiple tables of the relational database may be presented to the user via a single spreadsheet. Edits or additions to the data may be submitted to the relational database via query engine 330. As such, a user, via the spreadsheet application, can make modifications to the data stored by the relational database, view data, and/or run simulations as to the effects of changes (e.g., how does a 10% increase in the cost of labor affect product cost?).

Figure 4:
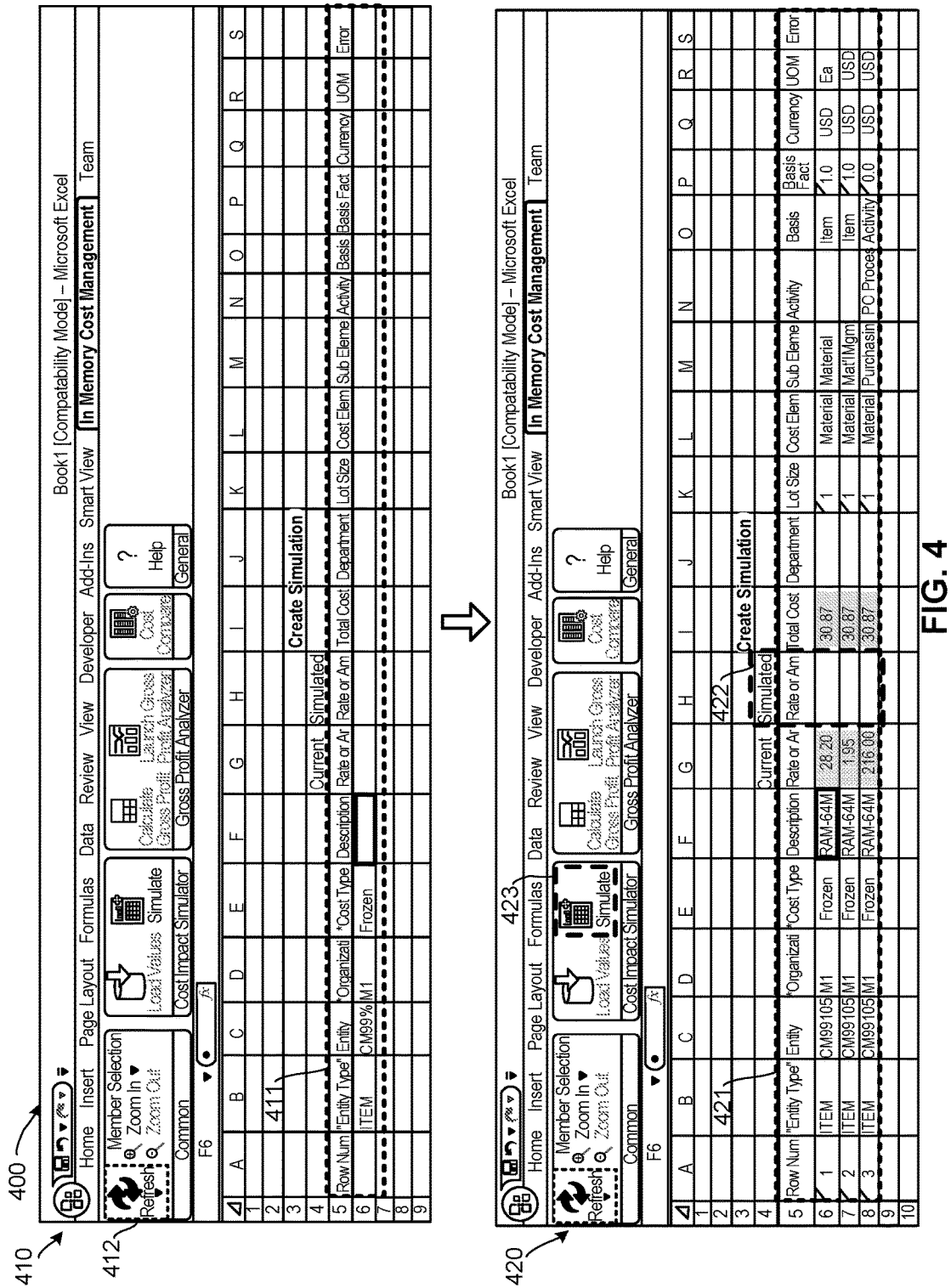
FIG. 4 illustrates embodiments of a spreadsheet application being used as an interface for a relational database.

FIG. 4 illustrates an embodiment 400 of a spreadsheet application being used as an interface for a relational database. As such, embodiment 400 may represent a query that is performed via the systems of FIGS. 1-3. In the illustrated embodiment of spreadsheet application 410, nineteen columns of the spreadsheet have already been formatted based on metadata previously retrieved from the relational database for attributes selected by the user (or that are indicated as required). The ordering of these attributes in the columns of the spreadsheet program may be based on the user's preference. The user, via the spreadsheet program has entered a query for four of the attributes as indicated in cells 411. In cells 411, the user has indicated that a search should be performed for all items corresponding to four specified attributes: an entity type of "ITEM", a wildcard for entity, indicating that the entity name begins with "CM99," belonging to the organization of "M1," and having a cost type of "Frozen." After entering the query, the user may provide a command, which can be integrated into the GUI of the spreadsheet application. A user may provide refresh command 412 to submit the query to the relational access server. Refresh command 412 may trigger the query to be submitted to the relational access server via an XML protocol.

Following successful execution of the query, spreadsheet application 410 may transition from presenting the query to presenting the results of the query in the form of spreadsheet application 420. Results 421 show the results of the query presented via cells of the spreadsheet application. Items that correspond to the query of cells 411 are retrieved, with such items and associated data being presented in the columns that correspond to the attributes in the columns of the spreadsheet application. In the illustrated example, three items were determined to correspond to the query. The data retrieved for these three items was distributed across multiple tables of the relational database. For example, "basis" was present in a first table, while "rate" was stored in a different table of the relational database. Simulated attribute 422 may permit a user to specify a value to simulate the effect of a change on the item. For instance, a change in "rate" could be provided to determine how the "total cost" of the item is affected. Simulate command 423 may trigger a simulation to be performed based on one or more user-supplied values (e.g., a change in current rate). A simulation may be submitted to the relational access server and executed by the relational access server. Results may be returned to the spreadsheet application for presentation to the user.

FIG. 5 illustrates an embodiment 500 of a spreadsheet application being used an interface for a relational database in which hierarchical data is available. When a query and/or simulation is performed via the spreadsheet application, at least some entries (which, for clarity, can refer to any type of entry (e.g., a physical item or part, a labor entry, etc.)) in the relational database may contain sub-items. For example, a particular part may be made of multiple subparts. Such parts that contain subparts or are otherwise associated with hierarchal child entries in the relational database may be represented in the spreadsheet application to permit the entry to be expanded to reveal the sub-components. For instance, the item of cells 511 is presented with a different highlight color. Such a highlight color, or other form of emphasis, may alert the user to the fact that the entry is associated with multiple sub-components. By selecting one or more of cells 511, a user may provide a command, such as zoom-in command 512, to trigger data related to the sub-components to be retrieved from multiple tables of the relational database for presentation as part of the spreadsheet. (It should be understood that the reverse, to collapse one or more entries, may also be possible via a zoom out command.)

FIG. 6 illustrates an embodiment 600 of a spreadsheet application being used as an interface for a relational database in which hierarchical data is presented. Embodiment 600 may be presented following the selection of one or more of cells 511 and zoom-in command 512 being received in relation to embodiment 500 of FIG. 5. The zoom-in command may trigger a query via query engine 330 (as illustrated in FIG. 3) for the sub-components and correspond attributes stored in multiple tables of the relational database. The spreadsheet may be updated to include sub-components 611. The spreadsheet may be rearranged such that the sub-components are presented in proximity to the entry that was expanded via the zoom-in command. The attributes for the sub-components may be retrieved from multiple tables of the relational database and presented via cells of the spreadsheet program. Highlighting, indenting, and/or other forms of emphasis may be used to indicate that the sub-components are related to the entry of cells 511.

Figure 7:
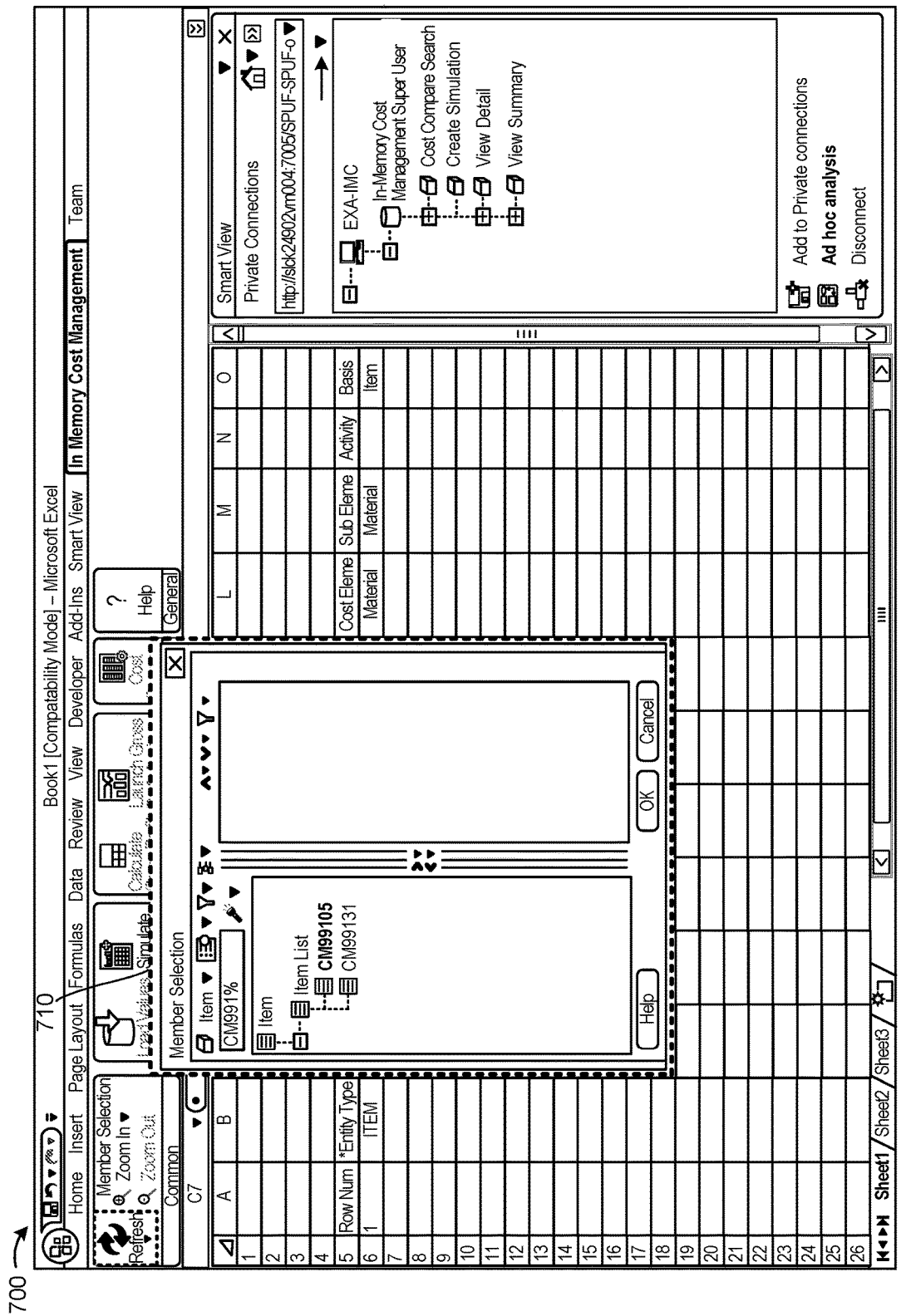
FIG. 7 illustrates an embodiment of a spreadsheet application being used as an interface for a relational database in which a pop-up is used to select an item type.

FIG. 7 illustrates an embodiment of a spreadsheet application 700 being used as an interface for a relational database in which a pop-up is used to select an item type. In spreadsheet application 700, a user desires to select one or more items from the relational database for inclusion on the spreadsheet. Pop-up 710 may permit a user to perform a query (e.g., a wildcard-based query) for items that match the query formulated by the user. From the results that are returned from the relational database, a user may be permitted to select none, one, or more than one items for inclusion on the spreadsheet. By using such an arrangement to run a query, the user may be able to pick-and-choose items without having to formulate a query that exactly differentiates the desired items from the undesired—rather the user can pick and choose such as after submitting a query that narrows down the pool of items available in the relational database. In the illustrated embodiment of spreadsheet application 700, the user has submitted a wildcard search for item "CM991%" which uses "%" as a wildcard character; thus, returning all items from the relational database that begins with "CM991."

While FIGS. 4-7 illustrate various embodiments of a spreadsheet application that is used in receiving user input and providing a presentation of data from a relational database, it should be understood that such figures are merely examples. For instance, while the figures may be derived from screenshots of Microsoft® Excel®, similar extensions may be introduced to other end-user spreadsheet applications to enable similar functionality with one or more relational databases. Further, as previously noted, while some cells of a spreadsheet may be used for presenting data from the relational database, other cells, such as of the same spreadsheet sheet may be used for presenting data from a multidimensional database, performing local calculations and/or data entry, and/or for other purposes.

Figure 8:
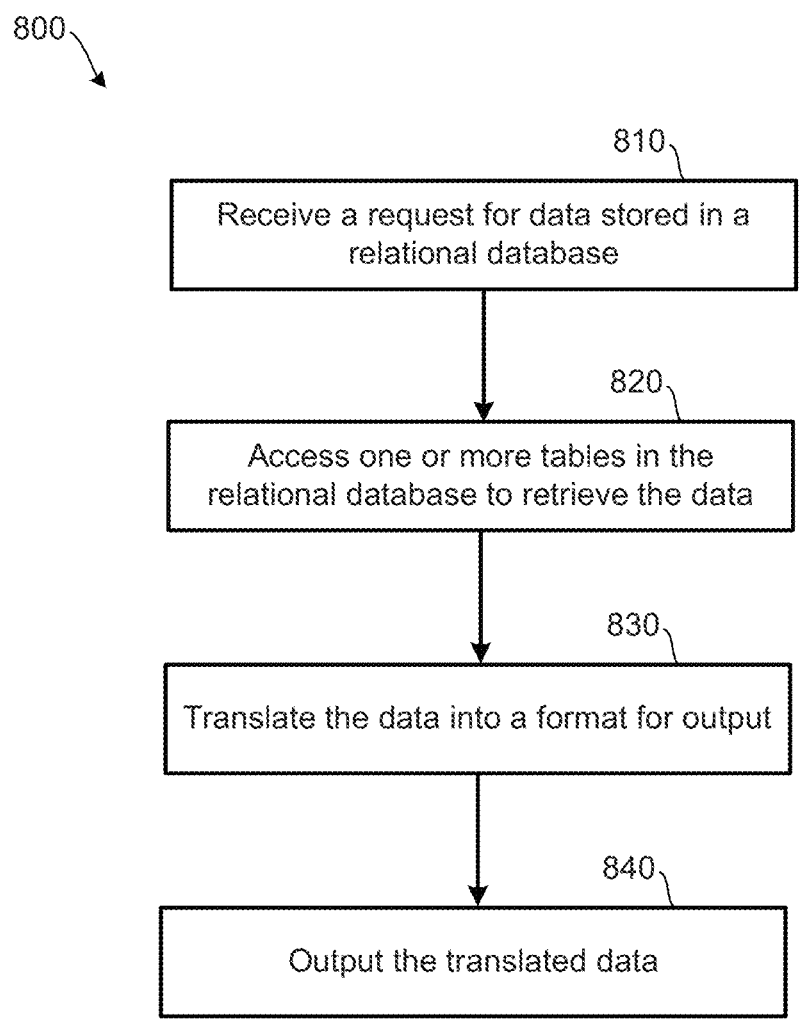
FIG. 8 illustrates an embodiment of a method for providing an interface to a relational database.

Various methods may be performed using the various systems and interfaces detailed in relation to FIGS. 1-7. FIG. 8 illustrates an embodiment of a method 800 for providing an interface to a relational database. Method 800 may be performed using the systems detailed in relation to FIGS. 1-3. Each step of method 800 may be performed by a relational access server. Such a relational access server may be a group of one or more computers that receives requests from a user computer system and interfaces with a relational database.

At step 810, a request for data stored in relational database may be received by the relational access server. This request for data from the relational database may be received from a spreadsheet application being executed by a user computer system. One or more columns (or other group of cells) in the spreadsheet application may have been formatted based on metadata from the relational database. As such, one or more columns within the spreadsheet may be configured for attributes associated with various entries in the relational database. A user may submit a query by entering one or more attributes for which the relational database will be searched. In some embodiments, such as illustrated in FIG. 7, a pop-up window may be used by the user to select various entries in the relational database to be included on the spreadsheet. Wildcards may be included in the request received at step 810. The request received at step 810 may be in the form of an XML request.

At step 820, the relational access server may access one or more tables of the relational database to retrieve the data corresponding to the request received at step 810. A SQL query may be formatted by the relational access server to interrogate the relational database. Attribute data from tables of the relational database may be retrieved for the entries corresponding to the query received at step 810. In some embodiments, each attribute may be treated from a different table of the relational database.

At step 830, the entries in the corresponding attribute data received by the relational access server in response to step 820 may be translated into a format appropriate to be transmitted to the spreadsheet application being executed by the user computer system. For instance, the data received in response to the SQL query may be formatted into an XML message for transmission to the spreadsheet application. At step 840, the translated data, which includes one or more entries and attribute data corresponding to the metadata for which at least some cells of the spreadsheet were already formatted, may be output to the spreadsheet application. An extension of the spreadsheet application may interpret the received data and present it via cells of the spreadsheet application.

Figure 9:
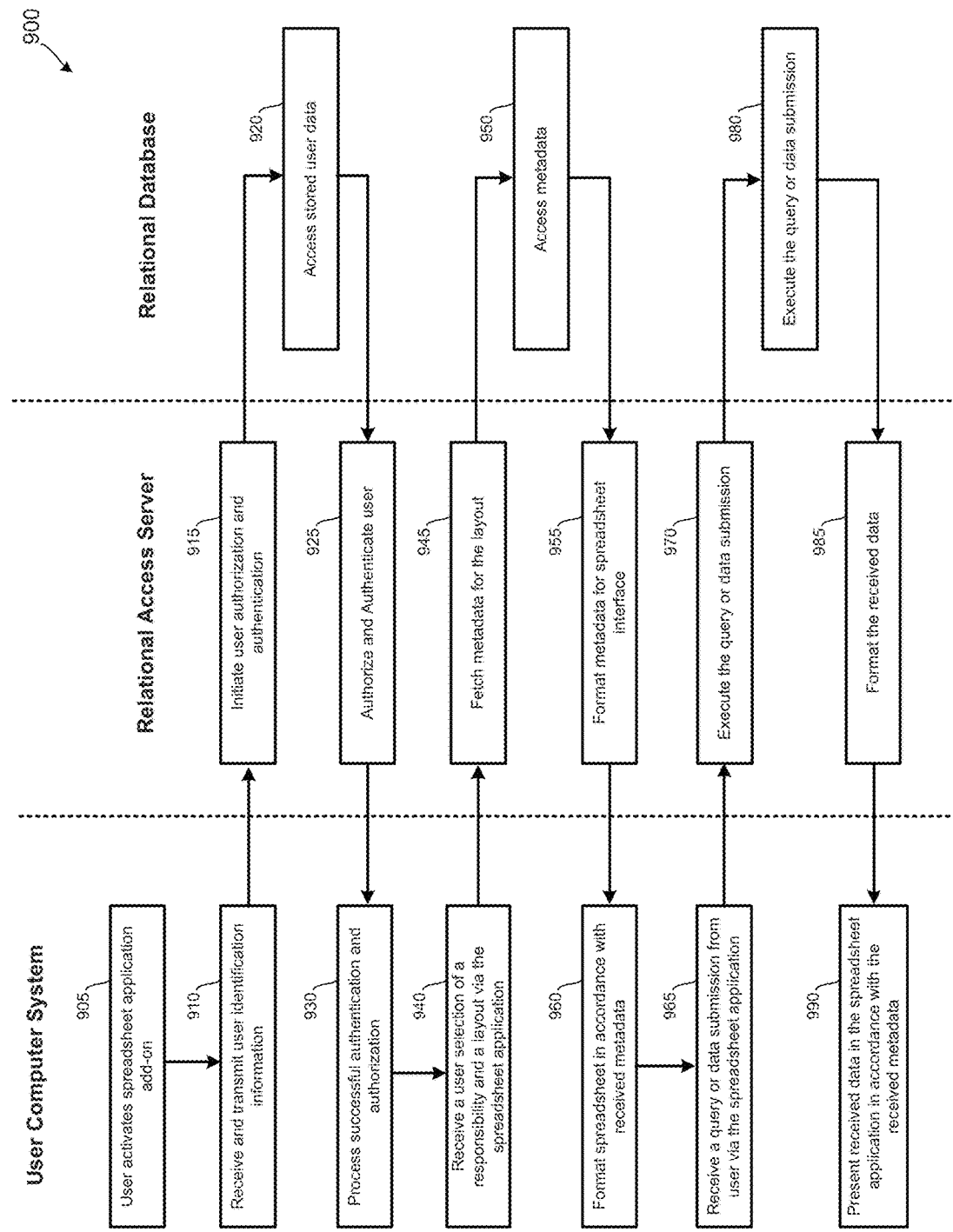
FIG. 9 illustrates another embodiment of a method for providing an interface to a relational database.

FIG. 9 illustrates another embodiment of a method 900 for interfacing with a relational database. Method 900 is presented in the form of a swim diagram. Method 900 may be performed using the systems detailed in relation to FIGS. 1-3. Each step of method 900 may be performed by the component noted in the respective column. It should be understood that in some embodiments, the relational access server may be combined with the relational database server or the user computer system.

At step 905, a user may access the spreadsheet application having an add-on (e.g., one or more extensions) that permit the spreadsheet application to interact with the relational access server. At step 910, the spreadsheet application may access or receive from the user identification information, such as a username and password. This username and password may be transmitted to the relational access server to permit authorization and authentication. At step 915, the relational access server may initiate a user authorization and authentication process, such as using a JAAS module. In some embodiments, at step 920, the relational database may be accessed to determine if the user is authorized and authenticated to access the relational database. Assuming so, at step 925, the relational access server authorizes and authenticates the user and returns a successful authorization and authentication results to the user computer system at step 930. At step 930, this successful authentication and authorization may be processed by the user computer system, such as by presenting successful login information to the user via the spreadsheet application.

At step 940, input may be received from user that defines responsibility of the user and the desired layout for cells of the spreadsheet application. The layout may indicate one or more attributes that are present within the relational database for entries within the database. For instance, the layout may define which columns in the spreadsheet application should be associated with what types of data. For example, user may define five different attributes that the user desires to be listed for each entry that is returned from the relational database. The user indication of responsibility and the layout may be transmitted to the relational access server. At step 945, relational access server may interpret the request received from the user computer system, which may be in the form of an XML request, and may translate such a request into a SQL query that can be used to fetch metadata from the relational database at step 945. Step 945 may include obtaining available connection with the relational database, such as by obtaining an available connection from a connection pool. At step 950, the metadata corresponding to the attributes which will be presented via cells of the spreadsheet may be accessed. This metadata may be returned to the relational access server. At step 955, the results of the SQL query may be formatted into a response to the suitable format to be transmitted to the spreadsheet application. For instance, the metadata may be formatted into an XML response configured to be interpreted by one or more extensions of the spreadsheet application.

At step 960, cells of the spreadsheet may be formatted in accordance with the received metadata from relational access server. Such formatting may include one or more columns of cells of the spreadsheet being formatted and labeled for the attribute which will be indicated in such column. For instance, the column may receive a name and may be assigned a particular data type (e.g., integer, string, etc.). Each column may be associated with an attribute that is stored in a different table of the relational database from at least some of the other attributes associated with other columns. Following such formatting, the user may be permitted to submit a query.

At step 965, the user may submit a query to the relational access server. The query may define one or more attribute values for which the user desires corresponding entries in the relational database to be returned. The user may be permitted to enter wildcards. In some embodiments, such as illustrated in FIG. 7, a pop-up window may be used by the user to select various entries in the relational database to be included on the spreadsheet. The request sent to the relational access server at step 965 may be in the form of an XML request.

At step 970, the relational access server may execute the query by formulating a SQL request to the relational database based on the XML request received from the user computer system. A connection to the relational database may be obtained from a connection pool. At step 980, the query may result in entries and associated attribute data being retrieved from multiple tables of the relational database.

The relational access server may access one or more tables of the relational database to retrieve the data corresponding to the request received at step 810. A SQL query may be formatted by the relational access server to interrogate the relational database. Attribute data from tables of the relational database may be retrieved for the entries corresponding to the query received at step 980. In some embodiments, each attribute may be retrieved from a different table of the relational database. The retrieved entries and associated attribute data from multiple tables may be transmitted to the relational access server and formatted into an XML response by the relational access server at step 985. At step 990, the translated data, which includes one or more entries and attribute data corresponding to the metadata for which at least some cells of the spreadsheet were already formatted, may be output to the spreadsheet application. An extension of the spreadsheet application may interpret the received data and present it via cells of the spreadsheet application. As such, following step 990, the user may view the results of the query, such as in spreadsheet application 420 of FIG. 4. Further, just a query is submitted in steps 965-980, modifications to one or more entries or additions to the data entries of the relational may be submitted by a user.

Figure 10:
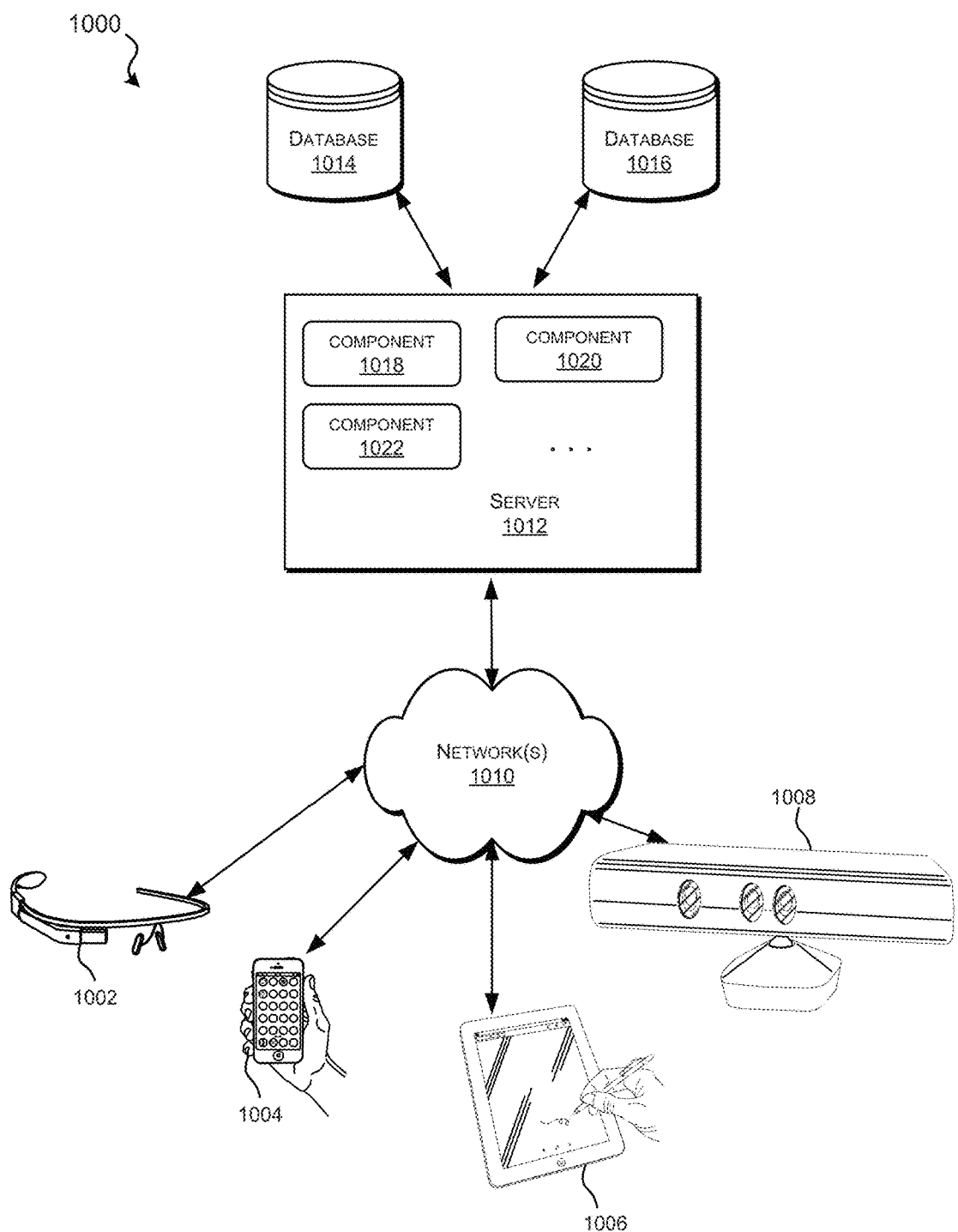
FIG. 10 illustrates a distributed system for implementing various embodiments detailed herein.

FIG. 10 depicts a simplified diagram of a distributed system 1000 for implementing various embodiments detailed in relation to the preceding figures. In the illustrated embodiment, distributed system 1000 includes one or more client computing devices 1002, 1004, 1006, and 1008, which are configured to execute and operate a client application such as a web browser, proprietary client (e.g., Oracle Forms), or the like over one or more network(s) 1010. Server 1012 may be communicatively coupled with remote client computing devices 1002, 1004, 1006, and 1008 via network 1010. Client computing devices 1002, 1004, 1006, and 1008 may represent forms of user computer systems, such as user computer system 120 of FIG. 1 and FIG. 2.

In various embodiments, server 1012 may be adapted to run one or more services or software applications provided by one or more of the components of the system. For instance, server 1012 may function as Relational access server system 110 of FIGS. 1-3. In some embodiments, these services may be offered as web-based or cloud services or under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in the figure, the software components 1018, 1020 and 1022 of distributed system 1000 are shown as being implemented on server 1012. For instance, the functions of Relational access server system 110 or the individual components of Relational access server system 110 as presented in FIG. 3 may be implemented as one or more of software components 1018, 1020, and 1022. In other embodiments, one or more of the components of distributed system 1000 and/or the services provided by these components may also be implemented by one or more of the client computing devices 1002, 1004, 1006, and/or 1008. Users operating the client computing devices may then utilize one or more client applications to use the services provided by these components. These components may be implemented in hardware, firmware, software, or combinations thereof. It should be appreciated that various different system configurations are possible, which may be different from distributed system 1000. The embodiment shown in the figure is thus one example of a distributed system for implementing an embodiment system and is not intended to be limiting.

Client computing devices 1002, 1004, 1006, and/or 1008 may be portable handheld devices (e.g., an iPhone®, cellular telephone, an iPad®, computing tablet, a personal digital assistant (PDA)) or wearable devices (e.g., a Google® Glass® head mounted display), running software such as Microsoft Windows Mobile®, and/or a variety of mobile operating systems such as iOS, Windows® Phone, Android®, BlackBerry® 12, Palm® OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux® operating systems. The client computing devices can be workstation computers running any of a variety of commercially-available UNIX® or UNIX-like operating systems, including, without limitation, the variety of GNU/Linux operating systems, such as, for example, Google Chrome OS. Alternatively, or in addition to, client computing devices 1002, 1004, 1006, and 1008 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1010.

Although exemplary distributed system 1000 is shown with four client computing devices, any number of client computing devices may be supported. Other devices, such as devices with sensors, etc., may interact with server 1012.

Network(s) 1010, which may also represent network 220, in distributed system 1000 may be any type of network familiar to those skilled in the art that can support data communications using any of a variety of commercially-available protocols, including, without limitation, TCP/IP (transmission control protocol/Internet protocol), SNA (systems network architecture), IPX (Internet packet exchange), AppleTalk, and the like. Merely by way of example, network(s) 1010 can be a local area network (LAN), such as one based on Ethernet, Token-Ring and/or the like. Network(s) 1010 can be a wide-area network and the Internet. It can include a virtual network, including, without limitation, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1012 may be adapted to run one or more services or software applications described in the foregoing disclosure. For example, server 1012 may correspond to a server for performing processing described above according to an embodiment of the present disclosure.

Server 1012 may run an operating system including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include, without limitation, those commercially available from Oracle, Microsoft, Sybase, IBM (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more databases 1014 and 1016. Databases 1014 and 1016 may reside in a variety of locations. At least one of such databases may be a relational database, such as hosted by relational database server system 130. By way of example, one or more of databases 1014 and 1016 may reside on a non-transitory storage medium local to (and/or resident in) server 1012. Alternatively, databases 1014 and 1016 may be remote from server 1012 and in communication with server 1012 via a network-based or dedicated connection. In one set of embodiments, databases 1014 and 1016 may reside in a storage-area network (SAN). Similarly, any necessary files for performing the functions attributed to server 1012 may be stored locally on server 1012 and/or remotely, as appropriate. In one set of embodiments, databases 1014 and 1016 may include relational databases, such as databases provided by Oracle, that are adapted to store, update, and retrieve data in response to SQL-formatted commands.

Figure 11:
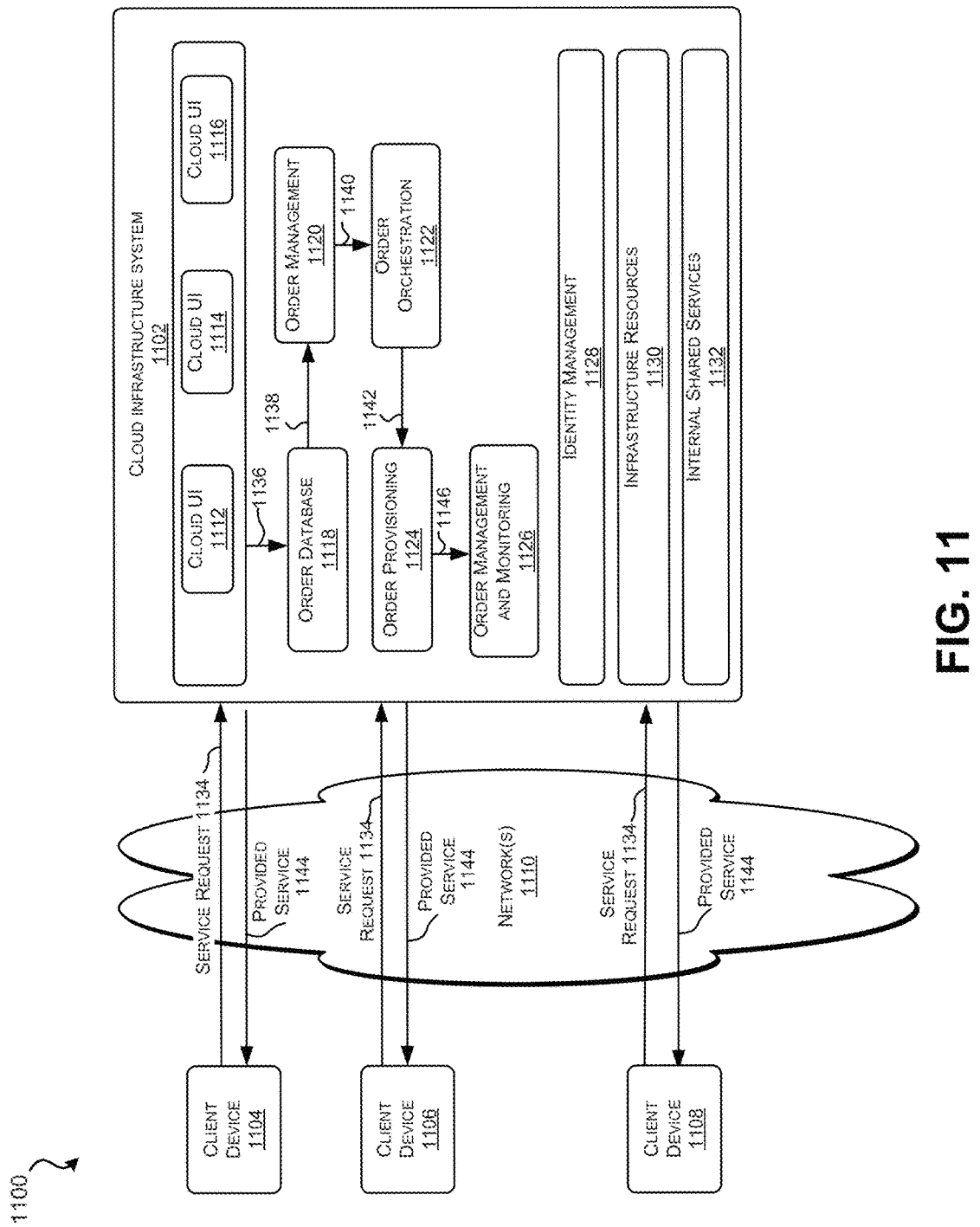
FIG. 11 illustrates a system environment by which services may be offered as cloud services, in accordance with an embodiment of the present disclosure.

FIG. 11 is a simplified block diagram of one or more components of a system environment 1100 by which services provided by one or more components of an embodiment system may be offered as cloud services, in accordance with an embodiment of the present disclosure. As previously detailed, the spreadsheet application that is presented via user computer systems may be remotely executed, such as in the form of a cloud service. Such a spreadsheet application can be provided as a service in accordance with the system environment 1100. In the illustrated embodiment, system environment 1100 includes one or more client computing devices 1104, 1106, and 1108 that may be used by users to interact with a cloud infrastructure system 1102 that provides cloud services. The client computing devices may be configured to operate a client application such as a web browser, a proprietary client application (e.g., Oracle Forms), or some other application, which may be used by a user of the client computing device to interact with cloud infrastructure system 1102 to use services provided by cloud infrastructure system 1102.

It should be appreciated that cloud infrastructure system 1102 depicted in the figure may have other components than those depicted. Further, the embodiment shown in the figure is only one example of a cloud infrastructure system that may incorporate an embodiment of the invention. In some other embodiments, cloud infrastructure system 1102 may have more or fewer components than shown in the figure, may combine two or more components, or may have a different configuration or arrangement of components.

Client computing devices 1104, 1106, and 1108 may be devices similar to those described above for 1002, 1004, 1006, and 1008. Although exemplary system environment 1100 is shown with three client computing devices, any number of client computing devices may be supported. Other devices, such as devices with sensors, etc., may interact with cloud infrastructure system 1102.

Network(s) 1110 may facilitate communications and exchange of data between client computing devices 1104, 1106, and 1108 and cloud infrastructure system 1102. Each network may be any type of network familiar to those skilled in the art that can support data communications using any of a variety of commercially-available protocols, including those described above for network(s) 1010. Cloud infrastructure system 1102 may comprise one or more computers and/or servers that may include those described above for server 1012.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1102 may be adapted to automatically provision, manage and track a customer's subscription to services offered by cloud infrastructure system 1102. Cloud infrastructure system 1102 may provide the cloud services via different deployment models. For example, services may be provided under a public cloud model in which cloud infrastructure system 1102 is owned by an organization selling cloud services (e.g., owned by Oracle) and the services are made available to the general public or different industry enterprises. As another example, services may be provided under a private cloud model in which cloud infrastructure system 1102 is operated solely for a single organization and may provide services for one or more entities within the organization. The cloud services may also be provided under a community cloud model in which cloud infrastructure system 1102 and the services provided by cloud infrastructure system 1102 are shared by several organizations in a related community. The cloud services may also be provided under a hybrid cloud model, which is a combination of two or more different models.

In some embodiments, the services provided by cloud infrastructure system 1102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1102. Cloud infrastructure system 1102 then performs processing to provide the services in the customer's subscription order.

In some embodiments, the services provided by cloud infrastructure system 1102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include, without limitation, services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1102 may also include infrastructure resources 1130 for providing the resources used to provide various services to customers of the cloud infrastructure system. In one embodiment, infrastructure resources 1130 may include pre-integrated and optimized combinations of hardware, such as servers, storage, and networking resources to execute the services provided by the PaaS platform and the SaaS platform.

In some embodiments, resources in cloud infrastructure system 1102 may be shared by multiple users and dynamically re-allocated per demand. Additionally, resources may be allocated to users in different time zones. For example, infrastructure resources 1130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1132 may be provided that are shared by different components or modules of cloud infrastructure system 1102 and by the services provided by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1102, and the like.

In one embodiment, as depicted in the figure, cloud management functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In exemplary operation 1134, a customer using a client device, such as client computing device 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the customer may access a cloud User Interface (UI), cloud UI 1112, cloud UI 1114 and/or cloud UI 1116 and place a subscription order via these UIs. The order information received by cloud infrastructure system 1102 in response to the customer placing an order may include information identifying the customer and one or more services offered by the cloud infrastructure system 1102 that the customer intends to subscribe to.

After an order has been placed by the customer, the order information is received via the cloud UIs, 1112, 1114 and/or 1116. At operation 1136, the order is stored in order database 1118. Order database 1118 can be one of several databases operated by cloud infrastructure system 1102 and operated in conjunction with other system elements. At operation 1138, the order information is forwarded to an order management module 1120. In some instances, order management module 1120 may be configured to perform billing and accounting functions related to the order, such as verifying the order, and upon verification, booking the order.

At operation 1140, information regarding the order is communicated to an order orchestration module 1122. Order orchestration module 1122 may utilize the order information to orchestrate the provisioning of services and resources for the order placed by the customer. In some instances, order orchestration module 1122 may orchestrate the provisioning of resources to support the subscribed services using the services of order provisioning module 1124.

In certain embodiments, order orchestration module 1122 enables the management of business processes associated with each order and applies business logic to determine whether an order should proceed to provisioning. At operation 1142, upon receiving an order for a new subscription, order orchestration module 1122 sends a request to order provisioning module 1124 to allocate resources and configure those resources needed to fulfill the subscription order. Order provisioning module 1124 enables the allocation of resources for the services ordered by the customer. Order provisioning module 1124 provides a level of abstraction between the cloud services provided by cloud infrastructure system 1102 and the physical implementation layer that is used to provision the resources for providing the requested services. Order orchestration module 1122 may thus be isolated from implementation details, such as whether or not services and resources are actually provisioned on the fly or pre-provisioned and only allocated/assigned upon request.

At operation 1144, once the services and resources are provisioned, a notification of the provided service may be sent to customers on client computing devices 1104, 1106 and/or 1108 by order provisioning module 1124 of cloud infrastructure system 1102.

At operation 1146, the customer's subscription order may be managed and tracked by an order management and monitoring module 1126. In some instances, order management and monitoring module 1126 may be configured to collect usage statistics for the services in the subscription order, such as the amount of storage used, the amount data transferred, the number of users, and the amount of system up time and system down time.

In certain embodiments, cloud infrastructure system 1102 may include an identity management module 1128. Identity management module 1128 may be configured to provide identity services, such as access management and authorization services in cloud infrastructure system 1102. In some embodiments, identity management module 1128 may control information about customers who wish to utilize the services provided by cloud infrastructure system 1102. Such information can include information that authenticates the identities of such customers and information that describes which actions those customers are authorized to perform relative to various system resources (e.g., files, directories, applications, communication ports, memory segments, etc.) Identity management module 1128 may also include the management of descriptive information about each customer and about how and by whom that descriptive information can be accessed and modified.

Figure 12:
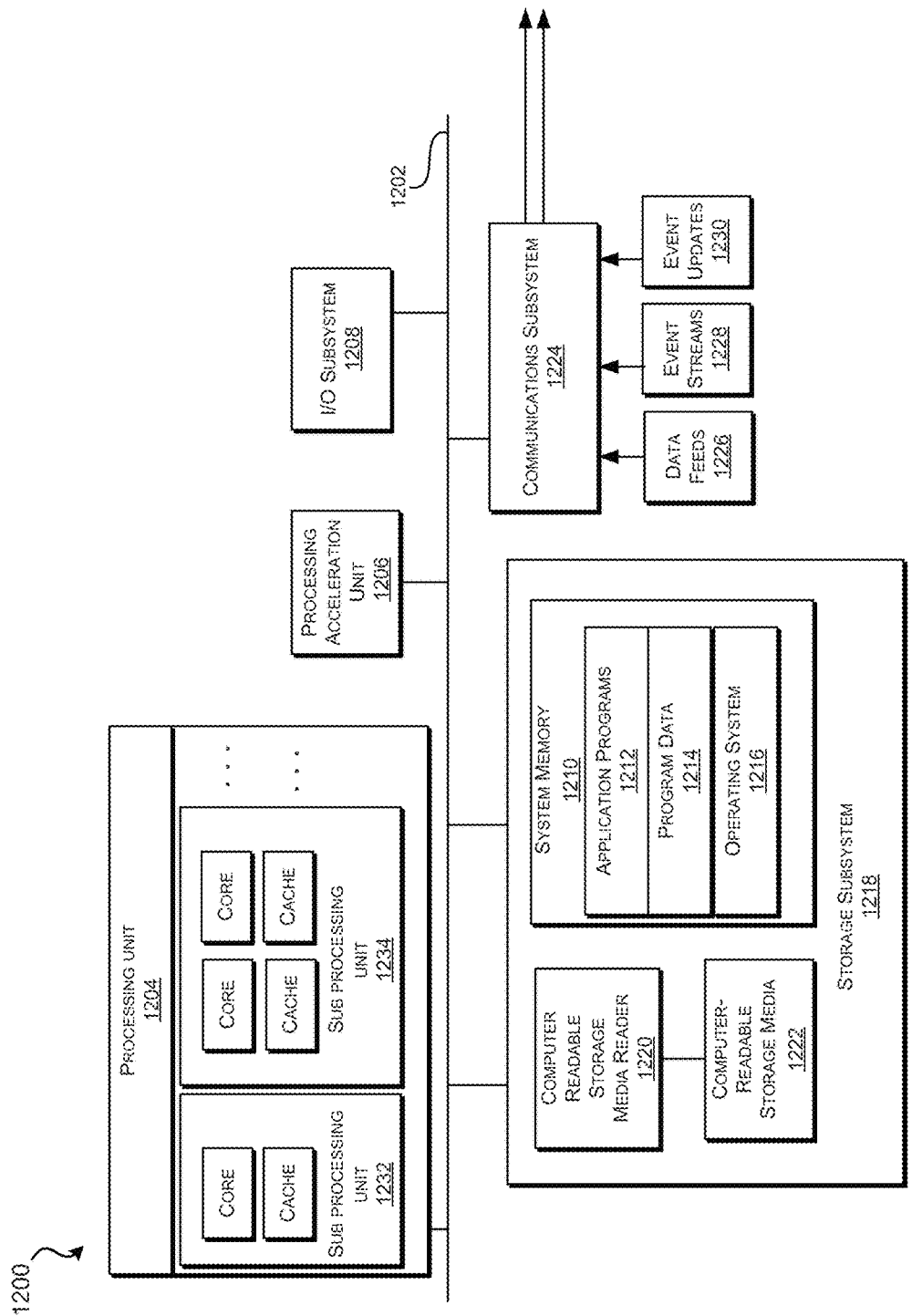
FIG. 12 illustrates an exemplary computer system, in which various embodiments of the present invention may be implemented.

FIG. 12 illustrates an exemplary computer system 1200, in which various embodiments of the present invention may be implemented. Computer system 1200 may be used to implement any of the computer systems previously described, such as the user computer systems, relational access servers, and relational database server systems. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes non-transitory, tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any one of several types of bus structures, including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices, such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including, without limitation, the variety of GNU/Linux operating systems, the Google Chrome® OS, and the like) and/or mobile operating systems such as iOS, Windows® Phone, Android® OS, BlackBerry® 12 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present invention.

Storage subsystem 1218 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as, but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments, communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments, communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A system for providing an interface to a relational database, the system comprising:
a relational interface web server system, comprising:
one or more processors; and
a memory communicatively coupled with and readable by the one or more processors and having stored therein processor-readable instructions which, when executed by the one or more processors, cause the one or more processors to:
receive a first eXtensible Markup Language ("WL")-based message from a spreadsheet application, the first XML-based message defining a layout, the layout identifying a plurality of attributes of the relational database and the layout identifying a mapping of the plurality of attributes to a plurality of columns in a spreadsheet of the spreadsheet application;
in response to receiving the first WL-based message defining the layout, generate and submit a first database query to fetch metadata associated with the plurality of attributes from the relational database;
receive, from the relational database in response to the first database query, the metadata comprising a data type value for at least one of the plurality of attributes;
transmit the metadata to the spreadsheet application for the spreadsheet application to format the spreadsheet of the spreadsheet application in accordance with the metadata;
after transmitting the metadata to the spreadsheet application, receive, from the spreadsheet application, a second XML-based message comprising a request for data stored in the relational database;
in response to receiving the second XML-based message comprising the request, generate and submit a second database query to retrieve the data indicated in the request from a plurality of tables in the relational database;
receive, from the relational database in response to the second database query, a query response comprising the data indicated in the request;
translate the query response in accordance with the layout and the metadata; and
output the translated query response to the spreadsheet application for the spreadsheet application to interpret and present via the spreadsheet.

2. The system for providing the interface to the relational database of claim 1, the system further comprising:
a user computer system configured to:
execute the spreadsheet application, wherein the spreadsheet application uses a software extension to communicate with the relational interface web server system; and
present, via a first plurality of cells of the spreadsheet, at least a portion of the translated query response, wherein the user computer system communicates with the relational interface web server system via a first network connection.

3. The system for providing the interface to the relational database of claim 1, the system further comprising:
a relational database server system configured to:
store data using the plurality of tables, wherein the relational database server system is accessible by the relational interface web server system.

4. The system for providing the interface to the relational database of claim 1, wherein the metadata comprises, for each of the plurality of attributes, an attribute data type and an attribute label.

5. The system for providing the interface to the relational database of claim 1, wherein the processor-readable instructions of the relational interface web server system, when executed, further cause the one or more processors to:
receive a validation request for an authorization and an authentication of a user from the spreadsheet application;
in response to the validation request for the authorization and the authentication of the user, perform the authorization and the authentication of the user; and
provide an authorization response and an authentication response to the spreadsheet application.

6. The system for providing the interface to the relational database of claim 2, wherein the user computer system is further configured to:
present, via a second plurality of cells of the spreadsheet, data retrieved from a multidimensional database distinct from the relational database, wherein the first plurality of cells and the second plurality of cells are presented concurrently.

7. The system for providing the interface to the relational database of claim 1, wherein the processor-readable instructions of the relational interface web server system, when executed, further cause the one or more processors to:
obtain an available connection with the relational database from a connection pool.

8. The system for providing the interface to the relational database of claim 1, wherein the processor-readable instructions of the relational interface web server system, when executed, further cause the one or more processors to:
receive, from the spreadsheet application, an indication of a selection of a cell from within the spreadsheet;
determine that the cell corresponds to hierarchical data;
retrieve, from the relational database, the hierarchical data; and
output the hierarchical data to the spreadsheet application.

9. A method for providing an interface to a relational database, the method comprising:
receiving, by a server system, a first eXtensible Markup Language ("XML")-based message from a spreadsheet application, the first XML-based message defining a layout, the layout identifying a plurality of attributes of the relational database and the layout identifying a mapping of the plurality of attributes to a plurality of columns in a spreadsheet of the spreadsheet application;
in response to receiving the first XML-based message defining the layout, generating and submitting, by the server system, a first database query to fetch metadata associated with the plurality of attributes from the relational database;
receiving, by the server system from the relational database in response to the first database query, the metadata comprising a data type value for at least one of the plurality of attributes;
transmitting, by the server system, the metadata to the spreadsheet application for the spreadsheet application to format the spreadsheet of the spreadsheet application in accordance with the metadata;
after transmitting the metadata to the spreadsheet application, receiving, by the server system from the spreadsheet application, a second WL-based message comprising a request for data stored in the relational database;

in response to receiving the second XML-based message comprising the request, generating and submitting, by the server system, a second database query to retrieve the data indicated in the request from a plurality of tables in the relational database;

receiving, by the server system from the relational database in response to the second database query, a query response comprising the data indicated in the request;

translating, by the server system, the query response in accordance with the layout and the metadata; and outputting, by the server system, the translated query response to the spreadsheet application for the spreadsheet application to interpret and present via the spreadsheet.

10. The method for providing the interface to the relational database of claim 9, the method further comprising:
executing, by a user computer system, the spreadsheet application, wherein the spreadsheet application uses a software extension to communicate with the server system; and
presenting, by the user computer system via a first plurality of cells of the spreadsheet, at least a portion of the translated query response, wherein the user computer system communicates with the server system via a first network connection.

11. The method for providing the interface to the relational database of claim 9, the method further comprising:
storing, using a relational database server system, data using the plurality of tables, wherein the relational database server system is accessible by the server system.

12. The method for providing the interface to the relational database of claim 9, wherein the metadata comprises, for each of the plurality of attributes, an attribute data type and an attribute label.

13. The method for providing the interface to the relational database of claim 9, the method further comprising:
receiving, by the server system, a validation request for an authorization and an authentication of a user from the spreadsheet application;
in response to the validation request for the authorization and the authentication of the user, performing, by the server system, the authorization and the authentication of the user; and
providing, by the server system, an authorization response and an authentication response to the spreadsheet application.

14. The method for providing the interface to the relational database of claim 10, the method further comprising:
presenting, by the user computer system via a second plurality of cells of the spreadsheet, data retrieved from a multidimensional database distinct from the relational database.

15. The method for providing the interface to the relational database of claim 14, wherein the first plurality of cells and the second plurality of cells are presented concurrently.

16. The method for providing the interface to the relational database of claim 9, the method further comprising:
receiving, by the server system from the spreadsheet application, an indication of a selection of a cell from within the spreadsheet;
determining, by the server system, that the cell corresponds to hierarchical data;

retrieving, by the server system, from the relational database, the hierarchical data; and
outputting, by the server system, the hierarchical data to the spreadsheet application.

17. A non-transitory processor-readable medium for providing an interface to a relational database, comprising processor-readable instructions configured to cause one or more processors to:
receive a first eXtensible Markup Language ("XML")-based message from a spreadsheet application, the first XML-based message defining a layout, the layout identifying a plurality of attributes of the relational database and the layout identifying a mapping of the plurality of attributes to a plurality of columns in a spreadsheet of the spreadsheet application;
in response to receiving the first XML-based message defining the layout, generate and submit a first database query to fetch metadata associated with the plurality of attributes from the relational database;
receive, from the relational database in response to the first database query, the metadata comprising a data type value for at least one of the plurality of attributes;
transmit the metadata to the spreadsheet application for the spreadsheet application to format the spreadsheet of the spreadsheet application in accordance with the metadata;
after transmitting the metadata to the spreadsheet application, receive, from the spreadsheet application, a second XML-based message comprising a request for data stored in the relational database;
in response to receiving the second XML-based message comprising the request, generate and submit a second database query to retrieve the data indicated in the request from a plurality of tables in the relational database;
receive, from the relational database in response to the second database query, a query response comprising the data indicated in the request;
translate the query response in accordance with the layout and the metadata; and
output the translated query response to the spreadsheet application for the spreadsheet application to interpret and present via the spreadsheet.

18. The non-transitory processor-readable medium for providing the interface to the relational database of claim 17, wherein the metadata comprises, for each of the plurality of attributes, an attribute data type and an attribute label.

19. The non-transitory processor-readable medium for providing the interface to the relational database of claim 17, wherein the processor-readable instructions are further configured to cause the one or more processors to:
receive a validation request for an authorization and an authentication of a user from the spreadsheet application;
in response to the validation request for the authorization and the authentication of the user, perform the authorization and the authentication of the user; and
provide an authorization response and an authentication response to the spreadsheet application.

20. The non-transitory processor-readable medium for providing the interface to the relational database of claim 17, wherein the processor-readable instructions are further configured to cause the one or more processors to:
receive, from the spreadsheet application, an indication of a selection of a cell from within the spreadsheet;
determine that the cell corresponds to hierarchical data;

retrieve, from the relational database, the hierarchical data; and output the hierarchical data to the spreadsheet application.

\* \* \* \* \*

UNITED STATES PATENT AND TRADEMARK OFFICE
CERTIFICATE OF CORRECTION

PATENT NO. : 10,140,352 B2
APPLICATION NO. : 14/334556
DATED : November 27, 2018
INVENTOR(S) : Hariharan et al.

Page 1 of 1

It is certified that error appears in the above-identified patent and that said Letters Patent is hereby corrected as shown below:

In the Specification

In Column 9, Line 24, delete ""1")," and insert -- "|"), --, therefor.

In Column 21, Line 65, delete "Ski®" and insert -- Siri® --, therefor.

Signed and Sealed this
Third Day of December, 2019

Andrei Iancu
*Director of the United States Patent and Trademark Office*